United States Patent [19]

Toyoda

[11] Patent Number: 4,780,807
[45] Date of Patent: Oct. 25, 1988

[54] PIPELINE PROCESSOR WITH OVERLAPPED FETCH AND EXECUTE CYCLES

[75] Inventor: Shinjiro Toyoda, Kamakura, Japan

[73] Assignee: Kabushiki Kaisha Toshiba, Kawasaki, Japan

[21] Appl. No.: 85,244

[22] Filed: Aug. 11, 1987

Related U.S. Application Data

[63] Continuation of Ser. No. 655,737, Sep. 28, 1984, abandoned.

[30] Foreign Application Priority Data

Sep. 30, 1983 [JP] Japan .................. 58-182604

[51] Int. Cl.[4] .................... G06F 13/00; G11C 7/00
[52] U.S. Cl. .................................. 364/200
[58] Field of Search ... 364/200 MS File, 900 MS File; 365/203

[56] References Cited

U.S. PATENT DOCUMENTS

| | | | |
|---|---|---|---|
| 4,030,079 | 6/1977 | Bennett et al. | 364/200 |
| 4,144,589 | 3/1979 | Baker et al. | 365/203 |
| 4,218,750 | 8/1980 | Carter et al. | 364/770 |
| 4,253,147 | 2/1981 | MacDougall et al. | 364/200 |
| 4,255,785 | 3/1981 | Chamberlin | 364/200 |
| 4,300,195 | 11/1981 | Raghunathan et al. | 364/200 |
| 4,399,507 | 8/1983 | Cosgrove et al. | 364/200 |
| 4,551,821 | 11/1985 | Yokouchi et al. | 365/203 |

FOREIGN PATENT DOCUMENTS 1493819 11/1977 United Kingdom .

OTHER PUBLICATIONS

IBM Technical Bulletin, vol. 14, No. 10, Mar. 1972, "Parallel Pipeline Organization of Execution Unit".

Primary Examiner—Gary V. Harkcom
Assistant Examiner—Lawrence E. Anderson
Attorney, Agent, or Firm—Finnegan, Henderson, Farabow, Garrett and Dunner

[57] ABSTRACT

This pipeline processor has an ALU, an accumulator register, a first data bus connected through a first switch circuit to output terminals of the accumulator register, and a second data bus connected to input terminals of the accumulator register through a second switch circuit. Data on the first data base is processed by the ALU, and supplied through a third switch circuit to the second data bus. First to third switch circuits respectively receive first to third control signals generated at a predetermined timing for controlling the data transfer by the signal generator of an execution control circuit. The execution control circuit is further provided with signal generator for generating a fourth control signal which renders the second switch circuit conductive during the precharge period of the first and second data buses. The third and fourth control signals are supplied through an OR gate to the second switch circuit.

1 Claim, 4 Drawing Sheets

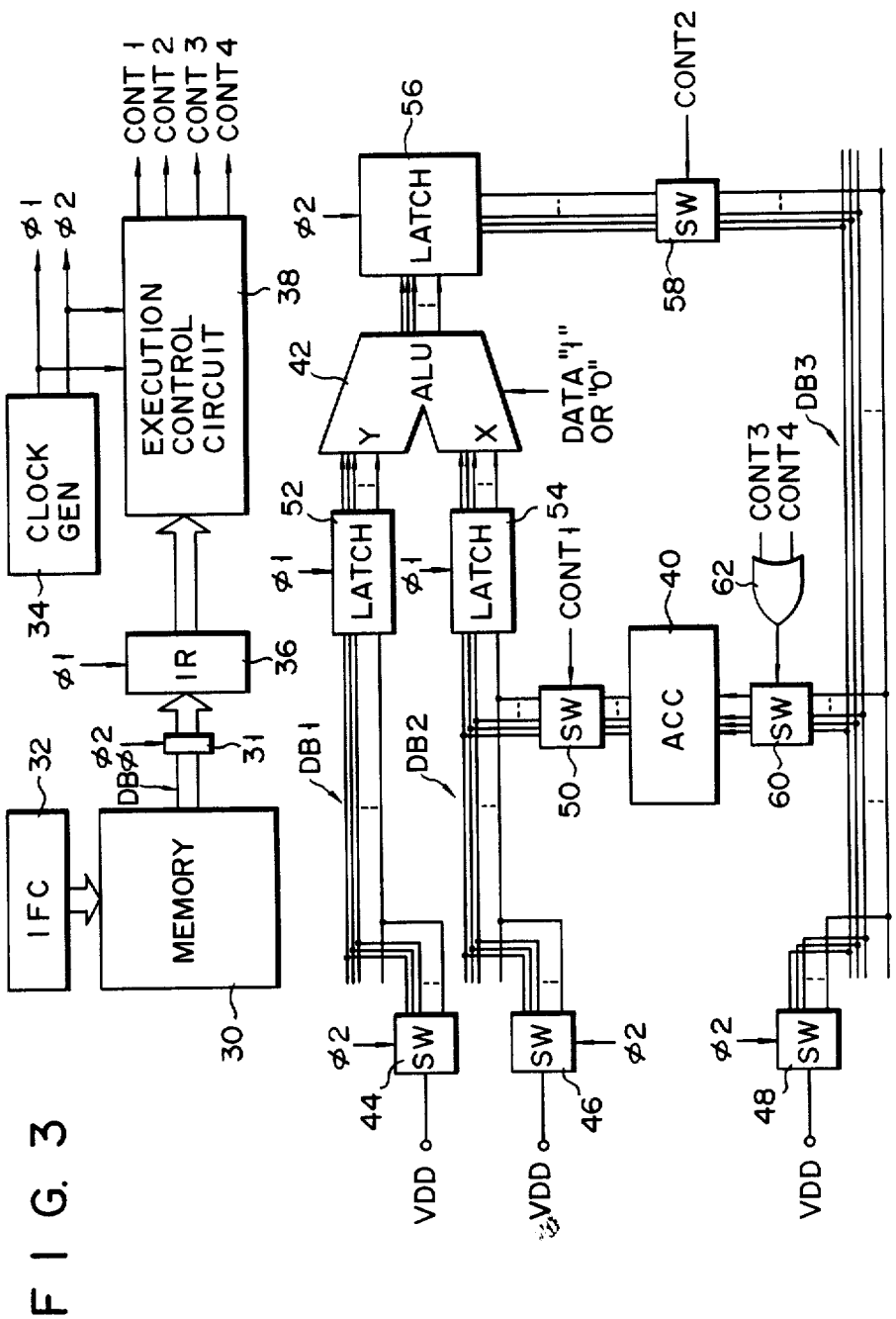
F I G. 3

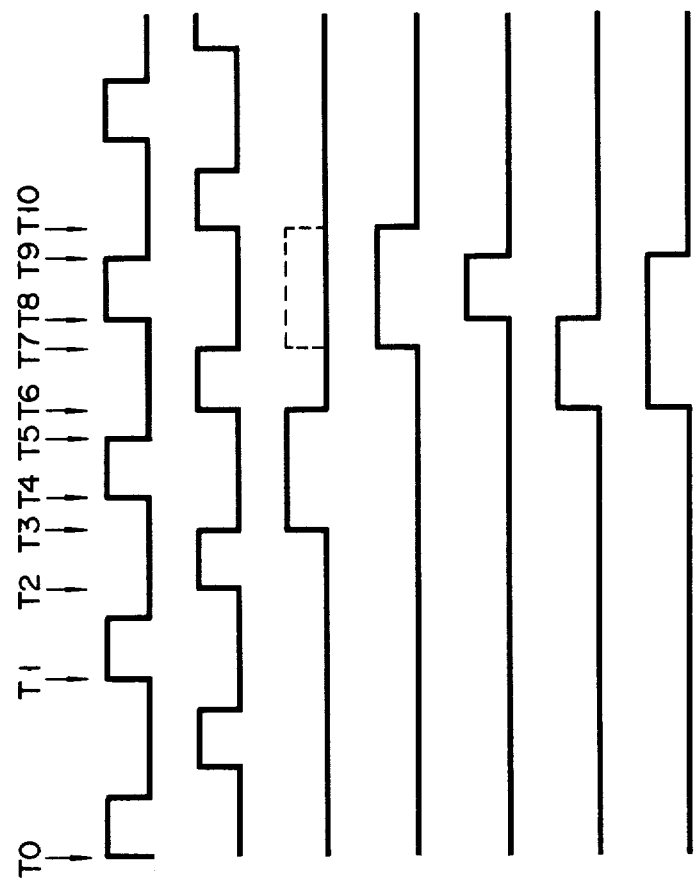

FIG. 5A

| 1 | 2 | 3 | 4 | 5 | 6 | 7 |

FIG. 5B

| INC1 | INC2 | INC3 | INC4 | INC5 | INC6 | INC7 |

FIG. 5C

| | INC1 | INC2 | INC3 | INC4 | INC5 | INC6 |

FIG. 5D

| | | INC1 | INC2 | INC3 | INC4 | INC5 |

FIG. 5E

| | | | INC1 | INC2 | INC3 | INC4 |

PIPELINE PROCESSOR WITH OVERLAPPED FETCH AND EXECUTE CYCLES

This application is a continuation of application Ser. No. 655,737, filed Sept. 28, 1984 now abandoned.

BACKGROUND OF THE INVENTION

The present invention relates in general to a data processor and, more particularly, to a pipeline processor which permits the overlapping of fetch and execute cycles.

Recently, the performance of computer systems has remarkably advanced. The data processing speed of the individual computer system largely depends upon the data processor which functions as a central part of this system, and a high speed data processor is still being developed by a number of computer designers and engineers.

There is, for example, a pipeline processor which is the known high speed data processor. This pipeline processor has an instruction fetching circuit, an instruction register, an execution control circuit and an execution circuit. These circuits simultaneously perform operations required to execute a plurality of instructions stored in a memory. In other words, in the pipeline processor, the instructions are fetched by the instruction fetching circuit in a first machine cycle, and then are stored in the instruction register in a second machine cycle. The execution control circuit decodes an OP-code of the instruction in the instruction register, and controls the operation of the execution circuit which includes, for example, an accumulator register, data buses, an ALU, and transfer gates in response to the OP-code. In contrast, the instruction fetching circuit receives a signal which respectively controls the fetch timings of a plurality of instructions from the execution control circuit. Thus, when the first instruction is, for example, fetched from the memory prior to the second instruction, the second instruction is fetched from the memory in the machine cycle before the execution of the first instruction has been completed. In other words, the execution of the second instruction can be started from the machine cycle immediately after the execution of the first instruction has been completed.

The above-described pipeline processor executes the instruction to subject the contents of an accumulator register to an arithmetic or logic operation (e.g., addition, subtraction, OR operation, AND operation) at an ALU, and to store the processed data in the accumulator register as described below.

FIGS. 1A to 1E respectively show first and second clock signals, and first through third control signals for respectively controlling the conduction of the first through third switch circuits, each of which contains a plurality of transfer gates. The first through third control signals are generated from the execution control circuit in synchronization with the first and second clock signals. Data in the accumulator register is supplied to an ALU through the first switch circuit and the first data bus during the time from T1 to T4. The data output by the ALU is held by a temporary latch during the time from T4 to T5 and supplied from the temporary latch to the second data bus thorugh the second switch circuit during the time from T5 to T8. The data on the second data bus is supplied to the accumulator register during the time from T6 to T7. Here, the ALU processes the data input during the time from T2 to T3, and outputs the processed data until the time T6. Further, the first and second data buses are precharged every time the second clock signal shown in FIG. 1B becomes at a high level. Incidentally, the period from a leading edge to the next leading edge of the first clock signal shown in FIG. 1A corresponds to oen machine cycle.

More specifically, four consecutive machine cycles are necessary to execute an instruction, such as an increment instruction, for processing the data from the accumulator register at the ALU and to update the content of the accumulator register.

FIG. 2A shows several machine cycles of a pipeline processor, and FIGS. 2B to 2E respectively show the periods of a fetching operation for executing a plurality of increment instructions INC1, INC2 . . . ; decoding operation; data processing operation; and updating operation of the contents in accumulator register.

The instruction INC1 is fetched in machine cycle 1, and decoded in machine cycle 2. The content (A) of the accumulator register is set to be (A) +1 in accordance with the instruction INC1 in machine cycle 3, and the accumulator register stores the processed data (A)+1 in machine cycle 4. On the other hand, the instruction INC2 is fetched in machine cycle 3, and decoded in machine cycle 4. The content (A)+1 of the updated accumulator register is added to 1 in accordance with the instruction INC2 in machine cycle 5, and the accumulator register stores the processed data (A)+2 in machine cycle 6. The instruction INC3 is fetched in machine cycle 5, and is decoded in machine cycle 6. (INC3, INC4 . . . are later processed in the same manner as described above.)

In the conventional pipeline processor, the hatched parts sown in FIGS. 2B to 2E are blank periods in which no operation is performed. If the instruction INC2 is fetched in the machine cycle 2, the blank period can be eliminated. In this case, if the processed data (A)+1 produced by the execution of the instruction INC1 is first stored in the accumulator register in machine cycle 4, the data (A)+1 should then be input from the accumulator register to the ALU in order to execute the INC2 in the same machine cycle 4. The first control signal is at a high level during the time from T5 to T8 as shown by the broken line in FIG. 1C.

When the charging state of the first data bus during the time from T5 to T8 is observed, the precharge of the first data bus is completed before the time T5. The first switch circuit between the first data bus and the accumulator register becomes conductive upon the rising of the first control signal at the time T5 to transfer the data in the accumulator register to the first data bus. In other words, the first data bus is discharged from the time T5 in accordance with the contents of the accumulator register. However, the accumulator register still holds the data (A) at this time, and the processed data (A)+1 is not stored in the accumulator register until the time T6. Therefore, the precharge of the first data bus becomes invalid by the data (A) before the time T6 for the ALU to receive the data (A)+1, and the processor as a result erroneously operates.

SUMMARY OF THE INVENTION

An object of the present invention is to provide a data processor which can reliably operate at a high speed.

According to the present invention, there is provided a data processor comprising a register for storing data, first and second data buses, a clock generating circuit for generating a first clock signal and a second clock signal having a predetermined phase difference from the first clock signal, a precharge circuit for precharging the first and second data buses in synchronization with the first clock signal, a first transfer circuit for transferring the data in the register to the precharged first data bus, a processing circuit for performing an arithmetic-logic operation on input data from the first data bus in synchronization with the second clock signal to supply an output data to the precharged value data bus, and a second transferring circuit for setting the data of precharge value to the register during the precharge period of the first and second data buses to supply the data on the second data bus to said register after the completion of the precharge period.

Thus, a plurality of instructions can be effectively fetched, and the interval before and after the execution of the respective instructions can be shortened.

BRIEF DESCRIPTION OF THE DRAWINGS

FIG. 3 is a circuit diagram of a pipeline processor according to one embodiment of the present invention;

FIGS. 4A to 4G are. respectively time charts of the first and second clock signals, first to fourth control signals and logical sum signals of the third and fourth control signals which are supplied to the execution circuit of the pipeline processor shown in FIG. 3;

FIG. 5A is a machine cycle of the pipeline processor shown in FIG. 3; and

FIGS. 5B to 5E show the periods of instruction fetching operations, the periods of instruction decoding operations, the periods of data processing operations, and the periods of the updating operations of an accumulator register—all the operations properly assigned to effect the pipeline processing in the pipeline processor shown in FIG. 3.

DETAILED DESCRIPTION OF THE PREFERRED EMBODIMENTS

Figures 1A, 1B, 1C, 1D, 1E, 2A, 2B, 2C, 2D, 2E:
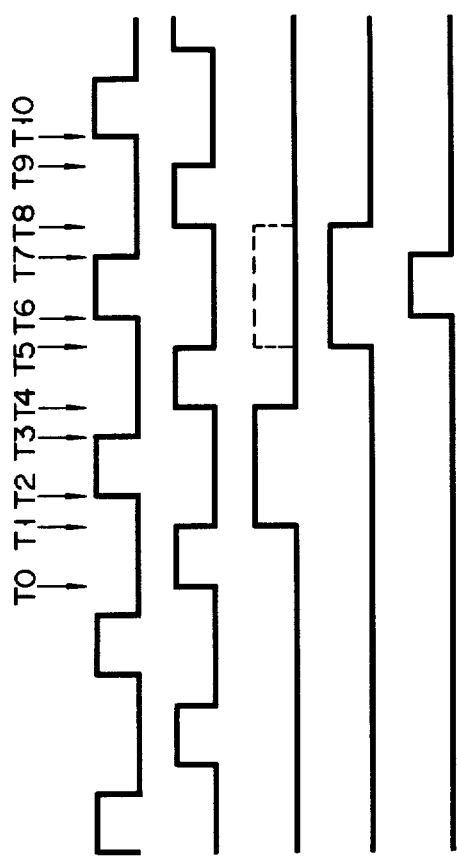
FIGS. 1A to 1E are time charts of the first and second clock signals and the first to third control signals which are supplied to an execution circuit of a conventional pipeline processor.
FIG. 2A is a machine cycle of the pipeline processor shown in FIG. 1.
FIGS. 2B to 2E show the periods of instruction fetching operations, the periods of instruction decoding operations, the periods of data processing operations, and the periods of the updating operations of an accumulator register—all the operations properly assigned to effect the pipeline processing.

An embodiment of the present invention will now be described for a pipeline processor with reference to the accompanying drawings. This pipeline processor has a memory 30 storing a plurality of instructions, and an instruction fetching circuit 32 for selectively fetching one of the instructions stored in the memory 30. An instruction is output from the memory 30 to a data bus DB$\phi$. A clock generator 34 is provided to generate clock signals $\phi 1$ and $\phi 2$, which have the same frequency but a different phase relationship. In other words, the clock signal $\phi 2$ rises after the fall of the clock signal $\phi 1$, and falls before the next rise of the clock signal $\phi 1$. The data bus DB$\phi$ is connected to a temporary latch 31 for latching the fetched instructions in response to the clock signal $\phi 2$. Instruction register 36 is connected to the temporary latch 31 to hold the instruction from the latch 31 in response to the clock signal $\phi 1$. An output terminal of this instruction register 36 is connected to an execution control circuit 38. This execution control circuit has a decoder for decoding an OP-code of the instruction in the instruction register 36, and signal generators for generating control signals of an execution circuit in response to the output signal of the decoder.

The execution circuit of the pipeline processor includes an accumulator register 40, an ALU 42, and data buses DB1 to DB3. The data buses DB1 to DB3 are respectively connected through switch circuits 44, 46, and 48 to a power source terminal VDD. The switch circuits 44, 46, and 48 become conductive through the high level clock signal $\phi 2$, and become nonconductive through the low level clock signal $\phi 2$. In other words, the data buses DB1 to DB3 are previously charged to a predetermined potential of a high level in synchronization with the rise of the clock signal $\phi 2$. The output terminals of the accumulator register 40 are connected through a switch circuit 50 to the data bus DB2. The switch circuit 50 transfers the data from the accumulator register 40 to the data bus DB2 in response to a high level control signal CONT1. Latch circuits 52, 54 are respectively connected to the data buses DB1, DB2 to hold the data therefrom in response to the clock signal $\phi 1$. Output terminals of the latch circuits are respectively connected to X-input port and Y-input port of the ALU42. The ALU42 is designed to perform arithmetic and logic operations such as addition, subtraction, AND operation, and OR operation, and perform one of the operations which is selected by the execution control circuit 38. Particularly, in the execution of the increment instruction, data "1" is also supplied from the execution control circuit 38 to a carry input terminal of the ALU42. An output data, i.e., the processed data of the ALU42, is supplied to a latch circuit 56. The latch circuit 56 holds the input data in response to the clock signal $\phi 2$. Output terminals of the latch circuit 56 are connected through a switch circuit 58 to the data bus DB3. The switch circuit 58 transfers data from the latch circuit 56 to the data bus DB3 when the control signal CONT2 is at a high level. The data bus DB3 is connected through a switch circuit 60 to the input terminals of the accumulator register 40. The conduction state of switch circuit 60 is controlled by an OR gate 62 which generates an output signal in accordance with control signals CONT3, CONT4 supplied from the execution control circuit 38. In other words, the switch circuit 60 transfers data on the data bus DB3 to the accumulator register 40 when receiving a high level output signal from the OR gate 62. Control signals CONT1 to CONT3 are similar to the conventional signals individually generated from the execution control circuits when data is necessarily transferred through the switch circuits 50, 58, 60 in synchronization with the clock signals $\phi 1$, $\phi 2$. For example, in the execution of the instruction for subjecting the data stored in the accumulator register 40 to an arithmetic-logic operation at the ALU42 and for updating the data in the accumulator register 40 with the output data of the ALU42, the control signal CONT1 is made at a high level from the trailing edge of the first pulse of the clock signal $\phi 2$ to the leading edge of the second pulse following the first pulse. The first pulse of the clock signal $\phi 2$ is generated immediately after decoding the instruction. The control signal CONT2 is made at a high level from the trailing edge of the second pulse of the clock signal $\phi 2$ to the leading edge of the third pulse following the second pulse. The control signal CONT3 is made at a high level from the leading edge to the trailing edge of the initial pulse of the clock signal $\phi1$, the initial pulse being generated after the fall of the second pulse of the clock signal $\phi2$.

The execution circuit 38 has, in addition to the first to third signal generators for generating the above-described control signals CONT1 to CONT3, a fourth signal generator for generating a control signal CONT4. This control signal CONT4 is made at a high level from the leading edge of the second pulse of the clock signal $\phi2$ to the leading edge of the initial pulse of the clock signal $\phi1$ after the rising of the second pulse. Thus, the control signal CONT4 can set the logic value "1" of all of the data bits of the accumulator register 40 during the precharge period of the data bus DB3.

An operation for executing, for example, an increment instruction by the pipeline processor will be described with reference to FIGS. 4A to 4G. FIGS. 4A to 4G respectively show clock signals $\phi1$, $\phi2$; control signals CONT1 through CONT4 generated in synchronization with the clock signals $\phi1$ and $\phi2$ to control the conduction of switch circuits 50, 58, 60, and a logical sum signal from the control signals CONT3, CONT4. When an address signal for designating a location in the memory 30 storing the increment instruction is supplied from the instruction fetch circuit 32 to the memory 30 at time T0, the increment instruction is output from the memory 30 to the data bus DB$\phi$. The temporary latch 31 latches the increment instruction in response to the initial rising of the second clock signal after the time T0. The instruction register 36 stores the increment instruction from the latch 31 at time T1. The execution control circuit 38 generates a control signal CONT1 of a high level as shown in FIG. 4C from the time T3 to T6 in response to the increment instruction in the instruction register 36. Here, the data buses DB1 to DB3 are precharged through switch circuits 44, 46, and 48 during the period between the times T2 to T3 where the clock signal $\phi2$ becomes at a high level. The switch circuit 50 is rendered conductive in response to the control signal CONT1 of a high level. Then, the contents (A) of the accumulator register 40 is transferred to the dat bus DB2 through the switch circuit 50. When the clock ignal $\phi1$ shown in FIG. 4A rises at time T4, the latch circuit 54 latches the data (A) on the data bus DB2, and supplies the data to X-input port of the ALU42. Here, addition is instructed by the execution control circuit 38 to the ALU42, and data "1" is set to the carry input terminal of the ALU 42. Data "00 . . . 0" is input through the latch circuit 52 to the Y-input terminal of the ALU42. The latch circuit 56 holds the output data (A)+1 (i.e., processed data) from the ALU42 in response to the clock signal $\phi2$ at time T6. The execution control circuit 38 respectively sets the control signal CONT4 for the period from the time T6 to T8 at high level as shown in FIG. 4F, and control signal CONT3 for the period from the time T8 to time T9 at high level as shown in FIG. 4E. An OR gate 62 supplies the logical sum signal shown in FIG. 4G as a control signal corresponding to the combination of the control signals CONT4, and CONT3 to a switch circuit 60, and makes the switch circuit 60 conductive for the period from time T6 to time T9.

Thus, data of a precharge value is set in the accumulator register 40 through the switch circuit 60 during a period from the time T6 to T7 in which the data buses DB1 to DB3 are precharged. In other words, each of the data bits in the accumulator register is set to a state equivalent to logic value "1." The execution control circuit 38 supplies a control signal CONT2 of a high level to the switch circuit 58 to render the switch circuit 58 conductive from the time T7. The precharge of the data buses DB1 to DB3 is again completed at the time T7. Then, data in the latch circuit 56 is stored in the accumulator register 40 through the switch circuit 58, the data bus DB3 and the switch circuit 60.

FIG. 5A shows the machine cycles of this pipeline processor. The machine cycle corresponds to a period beginning with the rise of a clock signal $\phi1$ to the next rise of that clock signal. FIGS. 5B to 5E show the periods of instruction fetching operations, the periods of instruction decoding operations, the periods of data processing operations, and the periods of the updating operations of an accumulator register. The instruction INC1 is fetched in machine cycle 1, and is decoded in a machine cycle 2. The content (A) of the accumulator register 40 is added (by +1) in machine cycle 3, and the processed data (A)+1 is stored in the accumulator register 40 in the machine cycle 4. On the other hand, the instruction INC2 is fetched in machine cycle 2, and is decoded in machine cycle 3. The content (A)+1 of the updated accumulator register 40 is incremented (by +1) in the machine cycle 4, and the processed data (A)+2 is stored in the accumulator register 40 in machine cycle 5. Here, referring to FIGS. 4A to 4G, the instructions INC1, INC2 are respectively output from the memory 30 at times T0, T1 in one machine cycle. In this case, the execution control circuit 38 sets the control signal CONT1 at high level from the time T7 to T10 to execute the instruction INC2 as shown by the broken line in FIG. 4C. Thus, the switch circuit 50 transfers the data in the accumulator register 40 to the data bus DB2 from the time T7. In the prior art, since the processed data (A)+1 of the instruction INC1 is not set in the accumulator register 40 at this time, the data (A) before the execution of the instruction INC1 is transferred to the data bus DB2.

According to the above-described pipeline processor, all data bits of the accumulator register 40 are set to the same precharge level (logic value "1") as the data buses DB1 to DB3 during a precharge period of the data buses DB1 to DB3 in the execution of the instruction instructing the processing of data in accumulator register by ALU42 and the storing of the output data of the ALU42 in the accumulator register 40. Therefore, the precharge of the data bus DB1 is not cancelled by unnecessary data remaining in the accumulator register 40 immediately after the switch circuit 50 is rendered conductive. Thus, when the operation of storing the output data of the ALU42 in the accumulator register 40 is effected in a machine cycle under the first instruction, the operation for supplying the data in the accumulator register 40 to the ALU42 can be effected in the same machine cycle under the second instruction.

More specifically, the pipeline processor can execute the above-described instructions in a short time.

Incidentally, in the embodiment described above, the conduction state of the switch circuit 60 is controlled by the output signal of the OR gate 62 to which the control signals CONT3, CONT4 have been input. However, similar advantages can also be provided even if the embodiment is modified as follows. The above-described accumulator register 40 may be replaced by an accumulator register capable of presetting all data bits to logic value "1" by an external signal. In this case, the accumulator register is controlled to preset the data bits by a control signal CONT4, and the conduction state of the switch circuit 60 is controlled merely by the control signal CONT3.

According to the present invention as described above, an operation for storing the output data of a processing circuit in accordance with the first instruction and an operation for processing data in the register by the processing circuit in accordance with the second instruction can be completed within the same machine cycle.

In this manner, a plurality of instructions can be efficiently fetched, and the interval before and after the execution of the respective instructions can be shortened.

What is claimed is:

1. A data processor comprising:

processing means having an input port and an output port for periodically performing arithmetic-logic operations;

a first data bus connected to said input port of said processing means;

first means for setting said first data bus to a predetermined voltage level prior to the completion of each arithmetic-logic operation of said processing means;

accumulator register means for storing input data required for performance of an associated arithmetic-logic operation, said register means having an input terminal and an output terminal;

first transferring means for transferring the input data from said output terminal of said register means through said first data bus to said input port of said processing means after said first data bus is set at said predetermined voltage level and before said processing means performs said arithmetic-logic operation associated with the content of said register means transferred to said input port by said first transferring means;

second transferring means for transferring output data from said output port of said processing means to said input terminal of said register means, said second transferring means including a second data bus connected to said output port of said processing means, and wherein said processor further includes second means for setting said second data bus to said predetermined voltage level at substantially the same timing as said first means sets said first data bus to said predetermined voltage level; and control means for clearing said input data in said register means by setting said register means to said predetermined voltage level after said processing means receives said input data and before said second transferring means starts to transfer said output data to said register means as new input data, said control means further including a signal generating circuit for generating a first control signal during a precharged period commencing immediately after said processing means receives said input data and corresponding to a time that said first and second means respectively set said first and second data busses to said predetermined voltage level, and wherein said second transferring means includes a switch circuit connected between said second data bus and said input terminal of said register means for enabling the transfer of data through said second data bus to said input terminal of said register means in response to said first control signal, said control means further including an OR gate for supplying said first and second control signal to said switch circuit, and said second transferring means further including a second signal generating circuit for generating a second control signal.

* * * * *